Dec. 3, 1968     F. K. WYCKOFF     3,414,003
VACUUM BREAKER VALVE
Filed May 19, 1964
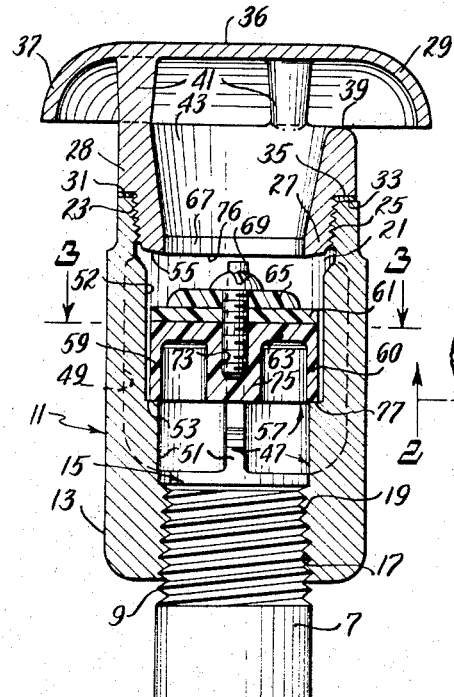
Fig. 1.
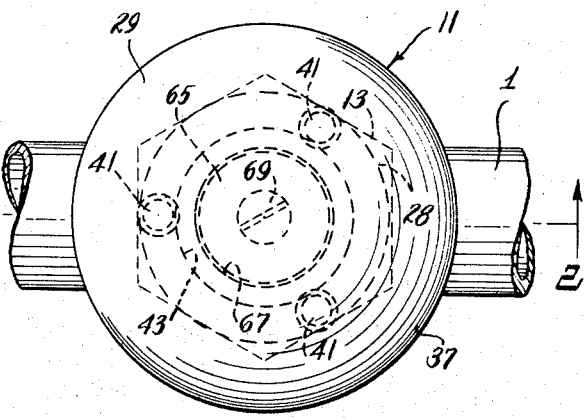
Fig. 2.
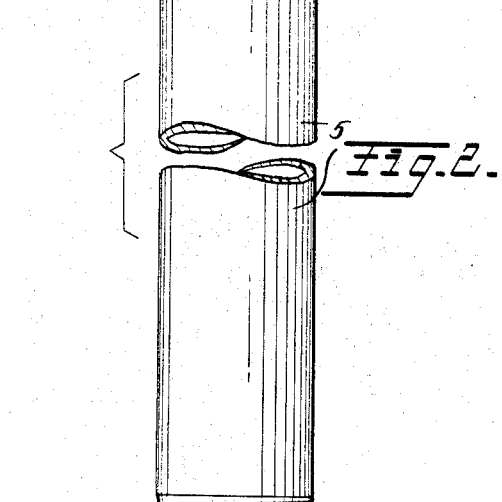
Fig. 3.
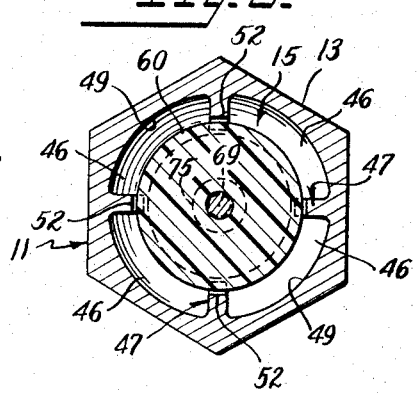
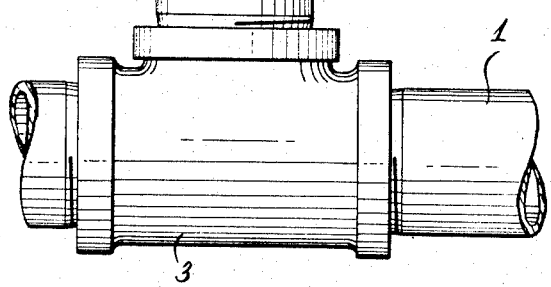
INVENTOR
Fred K. Wyckoff
BY
Bacon & Thomas
ATTORNEYS

United States Patent Office 3,414,003
Patented Dec. 3, 1968

3,414,003
VACUUM BREAKER VALVE
Fred K. Wyckoff, Costa Mesa, Calif., assignor to
Donald G. Griswold
Filed May 19, 1964, Ser. No. 368,628
8 Claims. (Cl. 137—217)

The present invention relates to improvements in vacuum breaker valves, and more particularly to an improved vacuum breaker valve designed to be employed in fluid distribution systems which are at certain times maintained under hydraulic pressure and at other times are vented to the atmosphere.

More particularly, the present vacuum breaker valve is designed for mounting upon the upper end of a vent pipe connected with a system wherein the hydraulic pressure is periodically relieved, and wherein it is desired that the vacuum breaker valve open under atmospheric pressure, whenever the hydraulic pressure within the system is relieved.

The principal object of the invention is to provide a vacuum breaker valve that will remain closed under line pressure, but which will open automatically under the influence of atmospheric pressure, whenever the hydraulic pressure tending to maintain the valve closed is less than atmospheric pressure.

Another object is to provide a vacuum breaker valve designed to be mounted upon the upper end of a vent pipe and to close when the pressure in said vent pipe is slightly higher than atmospheric pressure.

Still another object is to provide a vacuum breaker valve having a valve closure assembly somewhat resembling a float, which moves between open and closed position with a minimum of pressure differential and friction.

A further object is to provide a vacuum breaker valve that will open and permit a rapid and substantially unobstructed flow of atmospheric air into a fluid distribution system connected therewith whenever the pressure in said system is lower than atmospheric.

Still another object is to provide a vacuum breaker valve which is inexpensive to manufacture, has a minimum number of parts, requires none or very little maintenance, and is extremely reliable in its operation.

These and other objects and advantages of the invention will become more apparent from the following description when taken in conjunction with the accompanying drawings in which:

FIG. 1 is a plan view of the present vacuum breaker valve shown mounted on a vent pipe;

FIG. 2 is a vertical cross-sectional view of the vacuum breaker valve, taken on the line 2—2 of FIG. 1; and FIG. 3 is a horizontal cross-sectional view of the vacuum breaker valve, taken on the line 3—3 of FIG. 2.

As illustrated in the drawings, a pipe line 1 for conducting a liquid includes a fitting 3 into the stem of which is threaded an upstanding vent pipe 5. The upper end 7 of the vent pipe 5 is threaded as at 9 and has mounted thereon the novel vacuum breaker valve 11 of the present invention. The upper end 7 of the vent pipe 5 preferably extends to a sufficient elevation above the pipe line 1, and above any fluid distributing system or other connections thereto (not shown), to prevent liquid in the pipe 1 from discharging through the vacuum breaker 11 when the pressure of the liquid in the pipe 1 is relieved and the vacuum breaker valve 11 is in the open position, as shown in FIG. 1.

The vacuum breaker valve 11 includes an elongated cylindrical, body member 13 preferably formed of a non-corrosive metal, such as brass or bronze, or any suitable plastic material. The exterior of the body 13, as is clearly shown in FIG. 3, is of hexagonal configuration to provide suitable surfaces for engagement by the jaws of a wrench which may be employed to apply the vacuum breaker valve 11 to the vent pipe 5, or to remove it therefrom. Obviously, the exterior surface of the body 13 may be of any other desirable configuration, but in any event the body 13 is of a minimum length, and its side wall is imperforate, that is, it has no lateral openings. Thus, the body 13 is adapted to be mounted upon the upper end of the vent pipe 5.

The body member 13 is also formed with a fluid passage, generally designated 15, extending therethrough. The lower end 17 of the passage 15 is slightly restricted in size and is provided with threads 19, which mate with the threads 9 for securing the vacuum breaker valve 11 on the upper end of the vent pipe 5.

The upper end 21 of the passage 15 is threaded, as at 23, and receives threads 25 formed on a reduced portion 27 of a tubular stem 28 of a mushroom-shaped vent cap 29. A gasket 31 is positioned between an upper end 33 of the body member 13 and a horizontal shoulder 35 formed on the stem 28. A curved portion 37 of the vent cap 29 prevents foreign matter from falling into the vacuum breaker valve, and includes a flat central area 36 that overlies and is substantially coextensive with the outer diameter of the stem 28. The central area 36 merges into a downwardly curved margin 37, which is much greater in diameter than the stem 28. The cover 37 is supported in spaced relation above an upper edge 39 of the stem 28 by three equally spaced legs 41, which are preferably mounted integral with the stem 28 and cover 37.

The stem 28 is formed with a circular passage 43, which tapers downwardly and inwardly and which is coaxial with the passage 15 formed in the body member 13. The total axial area of the spaces between the legs 41, i.e., between the cover 37 and the upper edge 39 of the stem 28, is at least equal to the cross-sectional area of the passage 43, and thus provides unrestricted communication between the atmosphere and the interior of the body member 13. The vent cap 29 is preferably formed of brass, bronze or some other suitable, corrosion-resistant metal or plastic material.

In the embodiment of the invention disclosed, the interior of the body 13 has four equally spaced cavities 46 that form four guide ribs 47 that extend radially inwardly a short distance from a bottom wall 49 of said cavities. The ribs 47 extend longitudinally of the passage 15 from the restricted lower end 17 thereof to a point adjacent the upper threads 23. The lower portion 51 of each of the ribs 47 extends radially inwardly a slightly greater distance than the upper portion 52 thereof in order to provide a shoulder 53 spaced from and facing the lower end 55 of the vent cap stem 28. The shoulders 53 are located at a position about one-third the vertical height of the ribs 47.

A lightweight valve closure assembly 57 is floatingly confined within the body 13 and includes a cylindrical, inverted cup-shaped valve element 59, which is preferably formed of plastic material, such as "Delrin," and has a skirt 60 of slightly smaller outer diameter than the distance between opposite rib portions 52, but greater than the distance between opposite rib portions 51, whereby the lower edge 77 of said skirt can seat on the shoulders 53. A valve disc 61 made of "Teflon," or other suitable material, and of substantially the same outer diameter as the valve element 59, is seated on the upper surface of a wall 63 of the valve element 59. A guide disc 65, which is smaller in diameter than the valve disc 61 and also slightly smaller than a cylindrical guide bore 67 formed at the lower end of the passage 43 overlies the valve disc 61. The discs 61 and 63 are attached to the valve element 59 and are maintained concentric therewith by a screw 69 passing through an opening in the center of each of said discs and into a threaded opening 73 in a lug 75 depending from the central portion of the wall 63 of the valve element 59. The exposed upper marginal surface of the disc 61 beyond the periphery of the guide disc 65, is adapted to engage with an annular valve seat 76, formed on the lower end 55 of the stem 28, when the vacuum breaker valve 11 is closed.

The valve closure assembly 57 is guided by, and is freely slidable within, the ribs 47 for movement between an open position with the lower edge 77 of the skirt 60 of the valve element 59 seated on the shoulders 53, and a closed position with the upper marginal surface of the disc 61 seated on the annular valve seat 76 and with the guide disc 65 received within the guide bore 67.

Due to the light weight of the valve closure assembly 57 and to the inverted cup-shaped valve element 59, the assembly is readily movable from the open to the closed position by a very low superatmospheric fluid pressure in vent pipe 5, and thus prevents the escape of fluid through the vacuum breaker valve when pressure is applied to the pipe line 1. However, as soon as such pressure in the pipe line 1 is relieved or discontinued, the valve closure assembly 57 quickly drops automatically to the open position to vent to the atmosphere the pipe line 1 and any fluid distributing system or connections made thereto. There is no tendency of the Teflon disc 61 to stick to the valve seat 76.

The spaces between the outer periphery of the valve element 59 and the bottom wall of the cavities 49, when the valve closure assembly 57 is in the open position shown in FIG. 1, are designed to be large enough to permit atmospheric air to flow freely through the vacuum breaker valve to relieve any vacuum condition in the pipe 1.

While four equally spaced guide ribs 47 are shown, it will be obvious that three equally spaced ribs or a greater number than four ribs can be provided to guide and center the valve closure assembly 57 in the passage 15.

It is to be understood that the form of the invention herein shown and described is to be taken as a preferred embodiment of the same and that various changes, modifications or alteration of the parts may be resorted to without departing from the principles of the invention or the scope of the appended claims.

I claim:

1. A vacuum breaker valve, comprising: a generally cylindrical body having a longitudinal passage extending therethrough; a vent cap mounted upon one end of said body and having passage means formed therein for establishing communication between the atmosphere and said longitudinal passage; an annular valve seat located within said longitudinal passage; a plurality of longitudinally extending guide ribs formed on and projecting radially inwardly from said body along said longitudinal passage; shoulder means formed on and extending radially inwardly farther than said guide ribs and being axially spaced from and facing said valve seat; and a valve closure member disposed in said longitudinal passage radially inwardly of said guide ribs and above said shoulder means, said valve closure member presenting an elongated centering and guiding surface to said guide ribs and being freely movable from a position engaging said shoulder means to a position engaging said valve seat.

2. A vacuum breaker valve, comprising: an elongated body having a longitudinal passage extending therethrough; a vent cap having a tubular stem mounted upon one end of said body and having passage means formed therein for establishing communication between the atmosphere and said longitudinal passage; an annular valve seat carried by said tubular stem and disposed within said longitudinal passage; a plurality of longitudinally extending guide ribs formed on and projecting radially inwardly from said body along said longitudinal passage; shoulder means formed on and extending radially inwardly farther than said guide ribs and being axially spaced from and facing said valve seat; and a valve closure member disposed in said longitudinal passage radially inwardly of said guide ribs and above said shoulder means, said valve closure member presenting an elongated centering and guiding surface to said guide ribs and being freely movable from a position engaging said shoulder means to a position engaging said valve seat.

3. A vacuum breaker valve, comprising: a generally cylindrical body having a longitudinal passage extending therethrough; a vent cap having an inner end mounted upon one end of said body and having passage means formed therein for establishing communication between the atmosphere and said longitudinal passage; an annular valve seat carried at said inner end of said vent cap and disposed within said longitudinal passage; said body having a plurality of circumferentially spaced cavities in its inner surface forming a plurality of longitudinally extending guide ribs projecting radially inwardly along said longitudinal passage; shoulder means formed at a point on said guide ribs and extending radially inwardly farther than said guide ribs and being axially spaced from and facing said valve seat; and valve closure means disposed in said longitudinal passage and inwardly of the portions of said guide ribs above said shoulder means, said valve closure means presenting an elongated centering and guiding surface to said guide ribs and being freely movable from a position engaging said shoulder means to a position engaging said valve seat.

4. A vacuum breaker valve, comprising: a body having a longitudinal passage extending therethrough; a vent cap having an inner removably secured to one end of said body and having passage means formed therein for establishing communication between the atmosphere and one end of said longitudinal passage in said body; an annular valve seat rigid with said inner end of said vent cap; a plurality of equally spaced guide ribs formed on and extending radially inwardly from said body along said longitudinal passage from a point adjacent said valve seat to a point adjacent the other end of said longitudinal passage; shoulder means formed on and extending radially inwardly farther than said guide ribs and being located intermediate the opposite ends thereof and axially spaced from and facing said valve seat; and a valve member disposed in said body above said shoulder means, said valve member presenting an elongated centering and guiding surface to said guide ribs and being freely movable from a position engaging said shoulder means to a position engaging said valve seat.

5. A vacuum breaker valve, comprising: a body having a longitudinal passage extending therethrough; a vent cap having an inner end removably secured to said body and having passage means formed therein for establishing communication between the atmosphere and said longitudinal passage in said body; an annular valve seat rigid with said inner end of said vent cap; a plurality of substantially equally spaced ribs formed on and extending radially inwardly from the inner wall of said body defining said longitudinal passage and disposed lengthwise thereof; shoulder means formed on and extending radially inwardly farther than said ribs and being located intermediate the opposite ends thereof, said shoulder means being axially spaced from and facing said valve seat; and a valve element disposed in said body above said shoulder means, said valve element presenting an elongated centering and guiding surface to said guide ribs and being freely movable from a position engaging said shoulder means to a position engaging said valve seat, there being a space between said valve element and said inner wall of said body providing passage means for atmospheric air when said valve element is engaged with said shoulder means.

6. A vacuum breaker valve to be mounted upon a vent pipe, comprising: an elongated imperforate body having a circular fluid passage extending longitudinally therethrough; mounting means for securing said body upon the upper end of a vent pipe; a vent cap removably secured to the other end of said body; said vent cap having passage means formed therein communicating at one end thereof with the atmosphere and at the other end thereof with the interior of said body, said other end of said vent cap carrying an annular valve seat and being disposed in said fluid passage; at least three longitudinal ribs formed on and extending radially inwardly from the inner wall of said body defining said fluid passage and extending from adjacent said one end of said body to a point adjacent said other end of said vent cap; shoulder means formed on and extending radially inwardly farther than said ribs and being located intermediate the opposite ends thereof and being axially spaced from and facing said valve seat; a circular inverted cup type valve element disposed in said body above said shoulder means and being freely movable between said shoulder means and said valve seat, said valve element including a cylindrical skirt of an outside diameter such that its lower edge can seat on said shoulder means and also so that said valve element is centered and guided by and is freely slidable within said ribs; and a resilient disc secured to said valve element in confronting relation to said valve seat for cooperation with said valve seat to prevent the escape of fluid therethrough to the atmosphere.

7. A vacuum breaker valve to be mounted upright upon a vent pipe, comprising: an elongated imperforate body having a fluid passage extending longitudinally therethrough; mounting means at the lower end of said body for securing said body on the upper end of a vent pipe; a vent cap having a lower end removably secured to the upper end of said body and having passage means formed therein for establishing communication between the atmosphere and said fluid passage, said inner end being tubular and forming an annular valve seat; at least three longitudinal guide ribs formed on and extending radially inwardly from the inner wall of said body that defines said fluid passage, said guide ribs extending from adjacent said lower end of said body to a point adjacent said lower end of said vent cap; shoulder means formed on and extending radially inwardly farther than on said ribs and being located intermediate the opposite ends thereof and being axially spaced from and facing said valve seat; a circular valve element disposed in said fluid passage above said shoulder means and being freely movable between said shoulder means and said valve seat; said valve element having a cylindrical skirt of an outside diameter such that its lower edge can seat upon said shoulder means, and also so that said valve element is centered and guided by and is freely slidable within said guide ribs, said skirt and said wall defining said fluid passage being spaced apart and forming therebetween a passage for atmospheric air.

8. A vacuum breaker valve to be mounted upright upon a vent pipe, comprising: an imperforate elongated body having a circular fluid passage extending longitudinally therethrough; mounting means at the lower end of said body for securing said body upon the upper end of a vent pipe; a vent cap comprising a generally mushroom-shaped cover and a tubular stem separated therefrom by a plurality of circumferentially spaced legs forming a corresponding number of open air spaces between said cover and stem, said stem being removably secured to the upper end of said body and having passage means formed therein communicating at the upper end thereof with the atmosphere through said air spaces and at the lower end thereof with the fluid passage in said body, said lower end of said vent cap carrying an annular valve seat disposed in said fluid passage, said body having at least three circumferentially spaced cavities in its interior forming three longitudinal ribs extending radially inwardly from said body and defining in part said fluid passage and extending from adjacent said lower end of said body to a point adjacent said lower end of said vent cap, said ribs having portions thereof nearest said vent cap of less radial dimension than portions thereof nearest said lower end of said body, whereby shoulder means are formed on said ribs intermediate the opposite ends thereof, said shoulder means being axially spaced from and facing said valve seat; a circular inverted cup type valve element disposed in said body and being freely movable between said shoulder means and said valve seat, said valve element including a cylindrical skirt of an outside diameter such that its lower edge can seat on said shoulder means and also so that said valve element is centered and guided by and is freely slidable within said ribs; and a resilient disc secured to said valve element in confronting relation to said valve seat for cooperation with said valve seat to prevent the escape of fluid through said open air spaces to the atmosphere.

References Cited

UNITED STATES PATENTS

| 1,756,225 | 4/1930 | Thurstensen | 137—533.11 |
| 2,086,637 | 7/1937 | Price et al. | 137—217 |
| 2,209,473 | 7/1940 | Price et al. | 137—217 |
| 2,800,134 | 7/1957 | Merritt | 137—217 X |
| 3,145,724 | 8/1964 | Pelzer | 137—217 |
| 2,590,386 | 3/1952 | Dobrick | 251—357 X |
| 2,682,281 | 6/1954 | Ecker | 137—533.19 X |
| 2,686,528 | 8/1954 | Snyder | 137—217 |
| 3,036,594 | 5/1962 | Salisbury | 137—533.19 X |

WILLIAM F. O'DEA, *Primary Examiner.*

D. H. LAMBERT, *Assistant Examiner.*

UNITED STATES PATENT OFFICE
CERTIFICATE OF CORRECTION

Patent No. 3,414,003                                                                 December 3, 1968

Fred K. Wyckoff

It is certified that error appears in the above identified patent and that said Letters Patent are hereby corrected as shown below:

Column 4, line 10, "posi ion" should read -- position --; line 34, after "inner" insert -- end --. Column 5, line 44, after "than" cancel "on".

Signed and sealed this 10th day of March 1970.

(SEAL)
Attest:

Edward M. Fletcher, Jr,
Attesting Officer

WILLIAM E. SCHUYLER, JR.
Commissioner of Patents